(12) United States Patent  
Chen et al.

(10) Patent No.: US 9,195,485 B1  
(45) Date of Patent: *Nov. 24, 2015

(54) METHOD AND APPARATUS FOR CONCURRENTLY MAINTAINING QUEUES FOR MULTIPLE VIRTUAL MACHINES

(71) Applicant: Marvell International Ltd., Hamilton (BM)

(72) Inventors: James Chieh-Tsung Chen, Santa Clara, CA (US); Chuong Vu, San Jose, CA (US); Chor-Teck Law, Milpitas, CA (US); Binh Quoc Tran, San Jose, CA (US); Jiaqi Shen, Union City, CA (US); Brian Bosso, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 187 days.

This patent is subject to a terminal disclaimer.

(21) Appl. No.: 14/076,732

(22) Filed: Nov. 11, 2013

Related U.S. Application Data

(63) Continuation of application No. 13/230,595, filed on Sep. 12, 2011, now Pat. No. 8,582,507, which is a continuation of application No. 12/845,315, filed on Jul. 28, 2010, now Pat. No. 8,018,892, which is a continuation of application No. 10/829,131, filed on Apr. 21, 2004, now Pat. No. 7,768,959.

(51) Int. Cl.
*H04W 4/00* (2009.01)
*G06F 9/455* (2006.01)
*H04W 88/10* (2009.01)

(52) U.S. Cl.
CPC ............... *G06F 9/455* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 5,572,528 | A | 11/1996 | Shuen |
| 5,644,576 | A | 7/1997 | Bauchot et al. |
| 7,290,178 | B2 | 10/2007 | Rothman et al. |
| 7,464,138 | B2 | 12/2008 | Le et al. |
| 2002/0089875 | A1 | 7/2002 | Miyauchi |
| 2003/0212761 | A1 | 11/2003 | Meredith et al. |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner* — German J Viana Di Prisco

(57) ABSTRACT

A wireless network device includes a wireless network port, first and second virtual machines, and a processor. While executing the first virtual machine, the processor stores, in a third queue, data to be processed by the first virtual machine and the first virtual machine maintains, in a first queue, a copy of the data stored in the third queue. While executing the second virtual machine, the processor stores, in the third queue, data to be processed by the second virtual machine and the second virtual machine maintains, in a second queue, a copy of the data stored in the third queue. Upon resuming execution, the first virtual machine transfers, to the third queue, the copy of the data maintained in the first queue. Upon resuming execution, the second virtual machine transfers, to the third queue, the copy of the data maintained in the second queue.

17 Claims, 6 Drawing Sheets

(56) References Cited

U.S. PATENT DOCUMENTS

| | | |
|---|---|---|
| 2004/0010788 A1 | 1/2004 | Cota-Robles et al. |
| 2004/0081119 A1 | 4/2004 | Zhong et al. |
| 2005/0078624 A1 | 4/2005 | Shu et al. |
| 2005/0102671 A1 | 5/2005 | Baumberger |
| 2005/0138197 A1 | 6/2005 | Venables |
| 2005/0174962 A1 | 8/2005 | Gurevich |
| 2006/0123416 A1 | 6/2006 | Bertolotti et al. |

OTHER PUBLICATIONS

IEEE Std 802.11 a-1999 (Supplement to IEEE Std 802.11-1999) {Adopted by ISO/IEC and redesignated as ISOIIEC 8802-11: 1999/Amd 1 :2000(E)]; Supplement to IEEE Standard for Information technology—Telecommunications and 2 information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11 a-1999 (Supplement to IEEE Std 802.Nov. 1999) {Adopted by ISO/IEC and redesignated as ISOIIEC 8802-11: 1999/Amd 1 :2000(E)]; Supplement to IEEE Standard for Information technology—Telecommunications and 2 information exchange between systems—Local and metropolitan area networks—Specific requirements—Part 11: Wireless Lan Medium Access Control (MAC) and Physical Layer (PHY) specifications High-speed Physical Layer in the 5 GHz Band; LAN/MAN Standards Committee of the IEEE Computer Society; 91 pages.

IEEE P802.11g/D8.2, Apr. 2003 (Supplement to ANSI/IEEE Std 802.11.-1999 (Reaff 2003)); DRAFT Supplement to STANDARD [for] Information Technology—Telecommunications and information exchange 4 between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

802.11 n; IEEE P802.11-04/0889r6; Wireless LANs, TGn Sync Proposal Technical Specification; May 2005; 131 pages.

"About eCOS," http://sources.redha1.com/ecos/abou1.html, as appeared on website Apr. 21, 2004, 3 pages, Red Hat Inc., US.

METHOD AND APPARATUS FOR CONCURRENTLY MAINTAINING QUEUES FOR MULTIPLE VIRTUAL MACHINES

CROSS-REFERENCE TO RELATED APPLICATIONS

This is a continuation of U.S. patent application Ser. No. 13/230,595, filed on Sep. 12, 2011, which is a continuation of U.S. application Ser. No. 12/845,315 (now U.S. Pat. No. 8,018,892), filed on Jul. 28, 2010, which is a continuation of U.S. patent application Ser. No. 10/829,131 (now U.S. Pat. No. 7,768,959), filed on Apr. 21, 2004. The entire disclosures of the applications referenced above are incorporated herein by reference.

BACKGROUND

The present disclosure relates generally to wireless data communications. More particularly, the present disclosure relates to all-in-one wireless network devices.

Many wireless network devices are available to facilitate data communications and network access at home and in the workplace, including wireless access points, wireless clients, wireless bridges, wireless repeaters, and even wireless enabled laptop computers and personal digital assistants. FIG. 1 shows a conventional combination wireless network device 100. Wireless network device 100 comprises a processor 102, a wireless port 104, a memory controller 110, a non-volatile memory 112, a volatile memory 114, and an antenna 116.

FIG. 2 shows a conventional architecture 200 for a conventional combination wireless network device 100 that can act as either a wireless access point or a wireless client. Architecture 200 comprises a plurality of software images comprising a software image 202A for the wireless access point and a software image 202B for the wireless client, and wireless port 104 of FIG. 1. Image 202A comprises a conventional operating system 204A, a wireless access point application 206A, and a media access controller (MAC) device driver 210A. Image 202B comprises a conventional operating system 204B, a wireless client application 206B, and a MAC device driver 210B3. Wireless port 104 comprises a MAC 212 and a wireless physical-layer device (PHY) 214.

Conventional architecture 200 is limited in that only one wireless application can execute at a time. That is, according to architecture 200, combination wireless network device 100 can act either as a wireless access point or as a wireless client, but cannot act as both concurrently.

Furthermore, switching between modes is slow. For example, in order to switch from wireless access point mode to wireless client mode, processor 102 must reboot and load wireless client image 202B into volatile memory 114 before entering wireless client mode.

Finally, architecture 200 is inefficient because operating system 204 is replicated in each image 202, and can account for up to ⅔ of the storage space required by each image 202. This inefficiency increases the storage requirements for both non-volatile memory 112 and volatile memory 114, as well as the time required to transfer each image 202 from non-volatile memory 112 to volatile memory 114. These storage requirements mandate a larger, less portable, and more expensive package for conventional combination wireless network device 100.

SUMMARY

In general, in one aspect, this specification discloses a system configured to wirelessly communicate with a wireless network. The system includes a memory and a processor. The memory is configured to store a first queue, a second queue, and a processor queue. The processor is configured to: selectively execute a first virtual machine using the processor queue; while executing the first virtual machine, maintain the first queue as a copy of data in the processor queue; selectively execute a second virtual machine using the processor queue; and while executing the second virtual machine, maintain the second queue as a copy of data in the processor queue.

The details of one or more implementations are set forth in the accompanying drawings and the description below. Other features will be apparent from the description and drawings, and from the claims.

Figure 1:
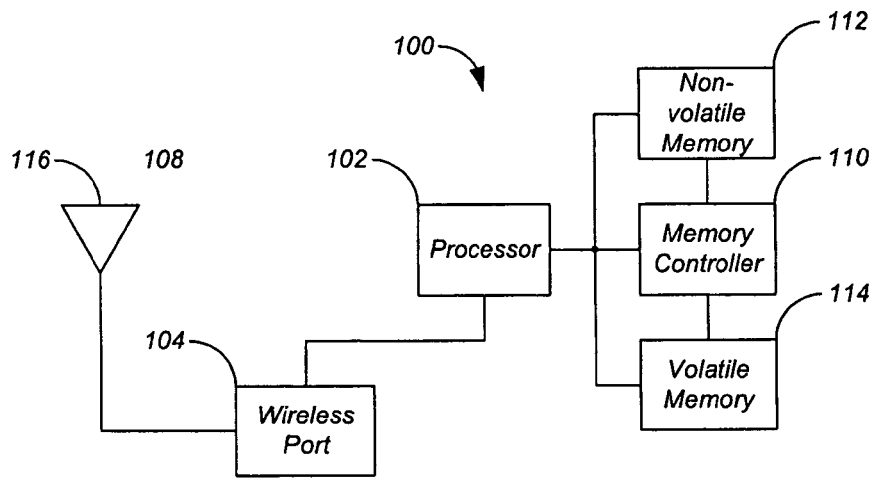
FIG. 1 shows a conventional combination wireless network device.
Figure 2:
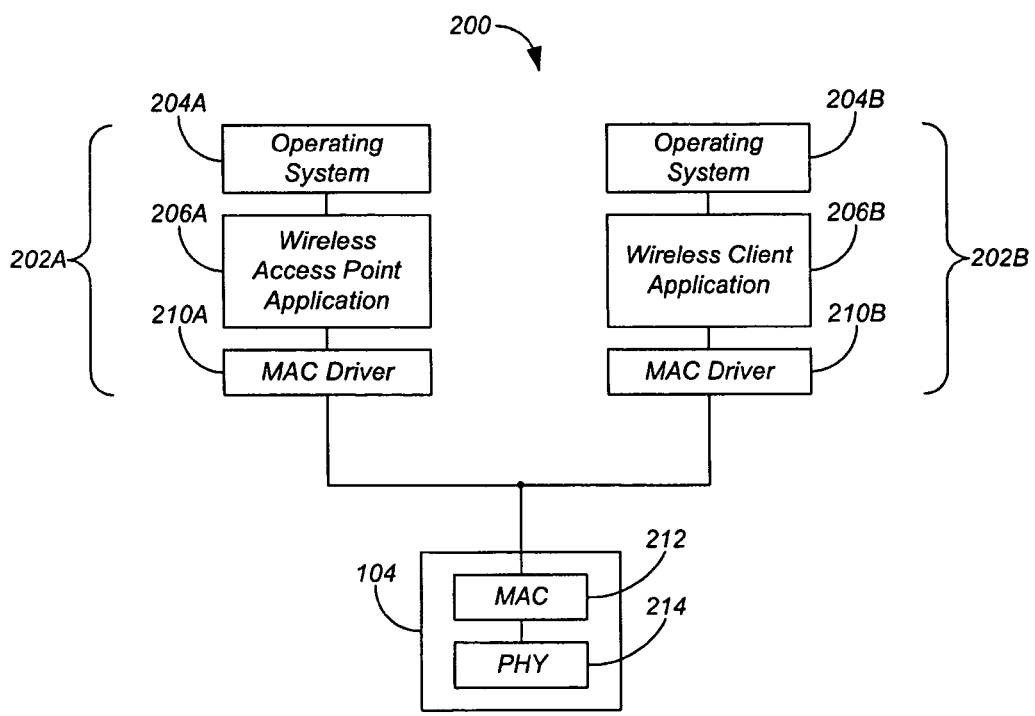
FIG. 2 shows a conventional architecture for a conventional combination wireless network device that can act as either a wireless access point or a wireless client.

The leading digit(s) of each reference numeral used in this specification indicates the number of the drawing in which the reference numeral first appears.

DETAILED DESCRIPTION

Figure 3:
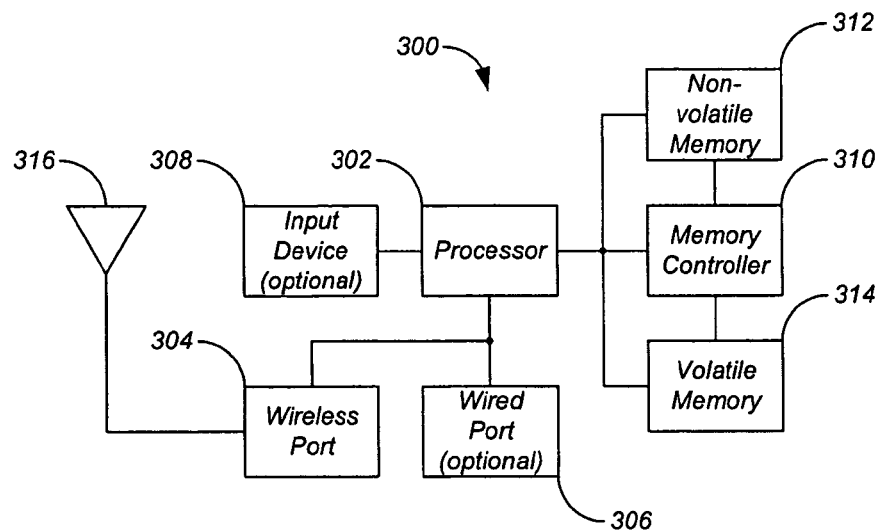
FIG. 3 shows an all-in-one wireless network device according to a preferred embodiment.

Embodiments of the present invention comprise various all-in-one wireless network devices. FIG. 3 shows an all-in-one wireless network device 300 according to a preferred embodiment. All-in-one wireless network device 300 comprises a processor 302, a wireless port 304, an optional wired port 306, an optional input device 308, a memory controller 310, a non-volatile memory 312, a volatile memory 314, and an antenna 316. Optional wired port 306 can be used to connect all-in-one wireless network device 300 to wired networks such as Ethernet networks available at work, at home, at hotels, and so on. Such embodiments are compliant, for example, with IEEE standards 802.11, 802.11a, 802.11b, 802.11g and 802.11n.

Figure 4:
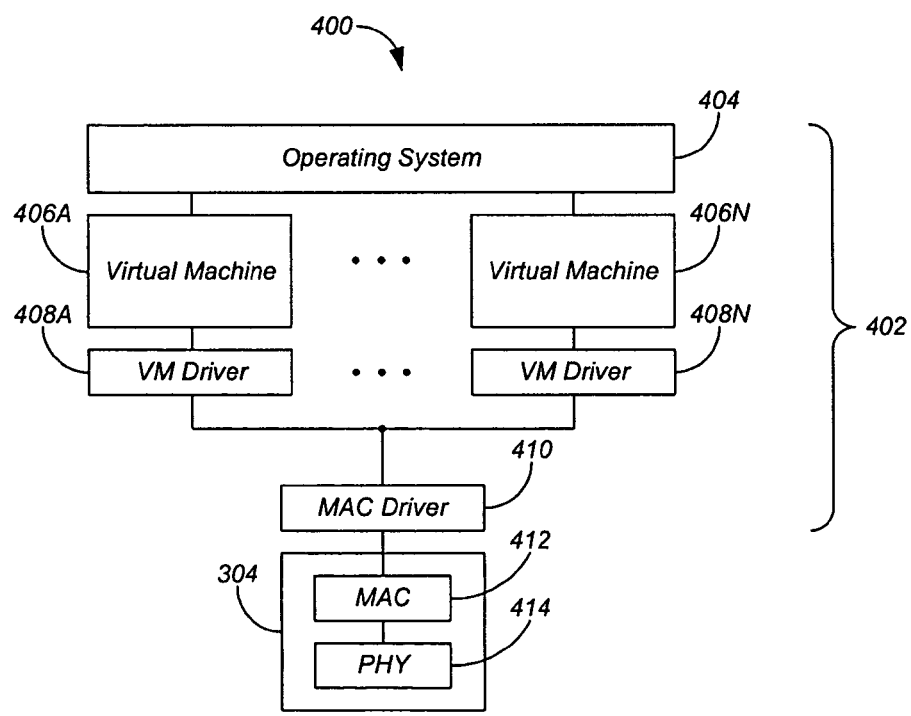
FIG. 4 shows an architecture for the all-in-one wireless network device of FIG. 3 according to a preferred embodiment employing an embedded processor.

FIG. 4 shows an architecture 400 for all-in-one wireless network device 300 according to a preferred embodiment employing an embedded processor. Architecture 400 comprises a software image 402 and wireless port 304 of FIG. 3. Image 402 comprises a multi-tasking operating system 404, a plurality of virtual machines 406A through 406N each having one of a plurality of virtual machine (VM) device drivers 408A through 408N, and a media access controller (MAC) device driver 410. Wireless port 304 comprises a MAC 412 and a wireless physical-layer device (PHY) 414.

A virtual machine is a software architectural block that allows multiple applications to share one hardware element, such as a wireless port. Each virtual machine 406 comprises a wireless network application to execute on multitasking operating system 404. The wireless network applications can include wireless network access points, wireless network clients, wireless network point-to-point bridges, wireless network multi-point bridges, wireless network repeaters, and the like. Multi-tasking operating system 404 can be implemented as any multi-tasking operating system such as eCos, which is described at http://sources.redhat.com/ecos/about.html, the contents of which are incorporated herein by reference.

Figure 5:
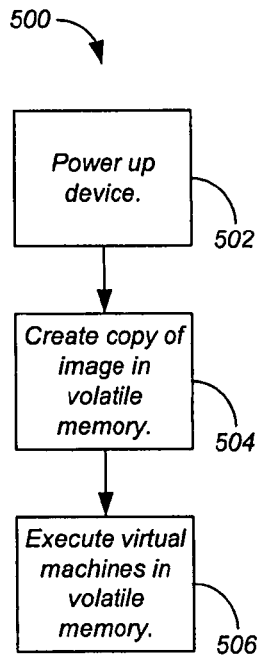
FIG. 5 shows a process for the all-in-one wireless network device of FIG. 3 and the architecture of FIG. 4 according to a preferred embodiment.

FIG. 5 shows a process 500 for all-in-one wireless network device 300 and architecture 400 according to a preferred embodiment. Image 202 is stored in nonvolatile memory 312. When all-in-one wireless network device 300 powers up (step 502), memory controller 310 creates a copy of image 202 in volatile memory 314 (step 504). Processor 302 executes virtual machines 406 from volatile memory 314 (step 506).

In some embodiments, two or more predetermined virtual machines execute concurrently whenever all-in-one wireless network device 300 powers up, so no user selection of modes is required. For example, in a universal repeater embodiment, described in detail below, an access point virtual machine and a client virtual machine execute concurrently. However, in other embodiments, a user can manipulate input device 308 to select one or more modes of operation, and processor 302 executes the corresponding virtual machines 406 according to the user's mode selection. Input device 308 can be a simple slide switch, a touch screen, or other graphical user interface.

Figure 6:
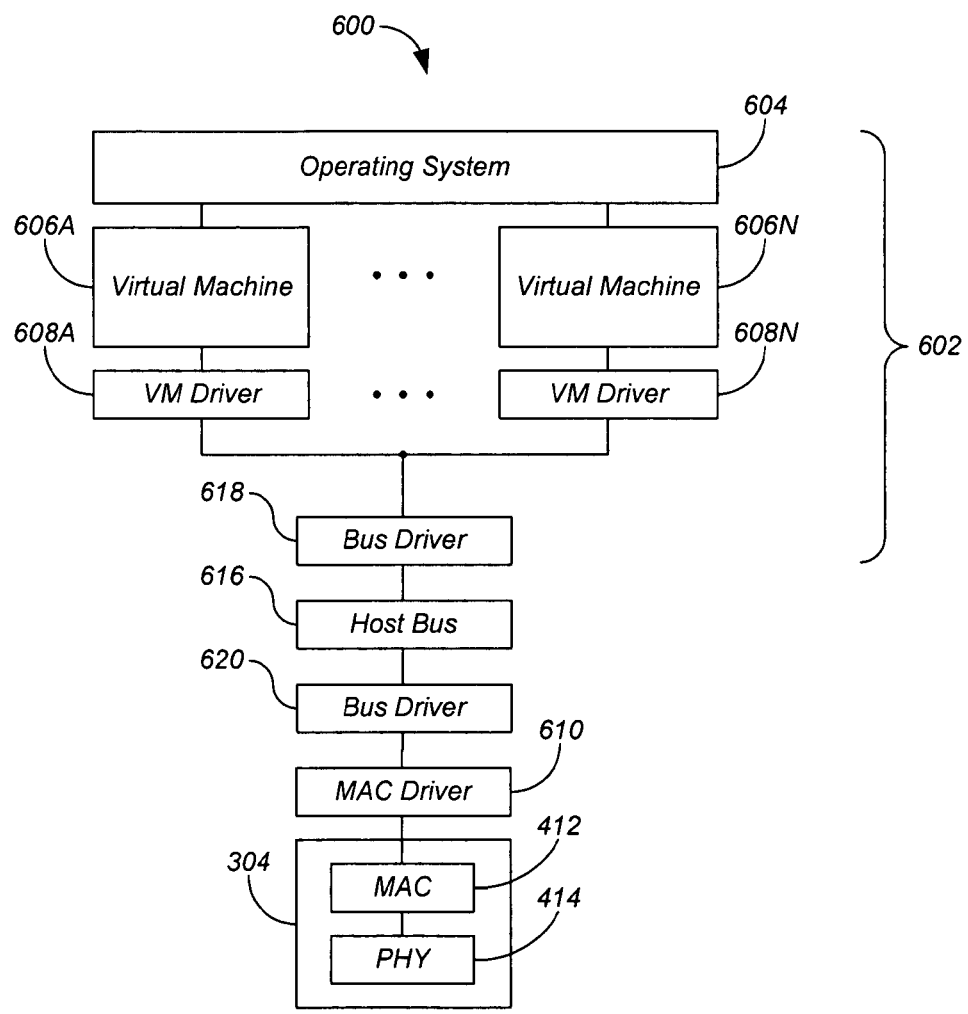
FIG. 6 shows an architecture for the all-in-one wireless network device of FIG. 3 according to a preferred embodiment employing a host processor such as the central processing unit (CPU) of a laptop computer.

FIG. 6 shows an architecture 600 for all-in-one wireless network device 300 according to a preferred embodiment employing a host processor such as the central processing unit (CPU) of a laptop computer. Architecture 600 comprises a software image 602 and a wireless port 304 such as wireless port 304 of FIG. 3. Image 602 comprises a multi-tasking operating system 604, a plurality of virtual machines 606A through 606N each having one of a plurality of virtual machine (VM) device drivers 608A through 608N, and a MAC device driver. Wireless port 304 comprises MAC 412 and wireless PHY 414.

Architecture 600 further comprises a host bus 616 that is used for communication between wireless port 304 and virtual machines 606. A host interface bus driver 618 allows communications between virtual machine device drivers 608 and host bus 616. A host interface bus driver 618 allows communications between virtual machine device drivers 608 and host bus 616. A port interface bus driver 620 allows communications between wireless port 304 and host bus 616. Architecture 600 operates in a manner similar to that described for architecture 400 as process 500 of FIG. 5.

Figure 7:
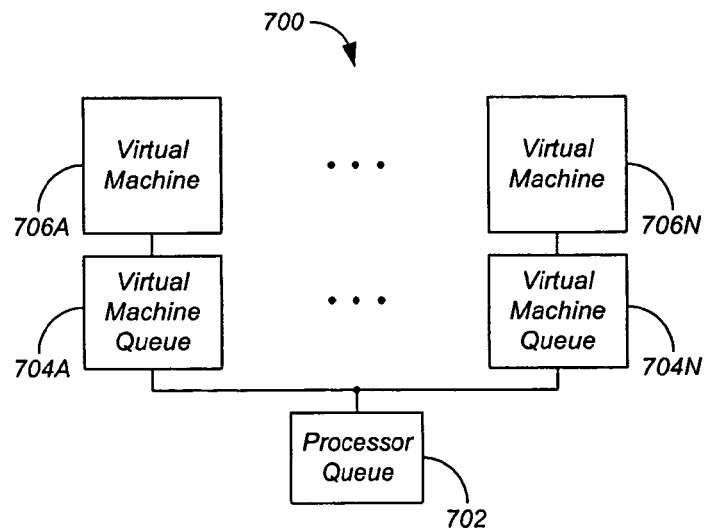
FIG. 7 shows an architecture enhancement that prevents any data loss.

In architectures 400 and 600 the virtual machines execute concurrently by each using the processor in turn. However, the potential exists for data such as network packets to be lost when the processor turns from one virtual machine to another. FIG. 7 shows an architecture enhancement 700 that prevents any such data loss. In architecture 700, the processor has a processor queue 702, and each virtual machine 706A through 706N has a respective virtual machine queue 704A through 704N.

The processor stores data to be processed for the virtual machine 706 being executed by the processor in the processor queue 702 according to well-known methods. But according to embodiments of the present invention, each virtual machine 706 maintains a copy in its virtual machine queue 704 of the data in the processor queue 702 when the processor is executing that virtual machine 706. For example, when the processor is executing virtual machine 706A, virtual machine 706A maintains a copy in its virtual machine queue 704A of the data in the processor queue 702.

When the processor is executing another virtual machine 706, the copy is kept intact. Returning to the example, when the processor is executing virtual machine 706N, virtual machine 706A keeps in virtual machine queue 704A an intact copy of the processor queue 702 as of the time when the processor stopped executing virtual machine 706A.

When the processor resumes executing a virtual machine 706 after executing another virtual machine 706, the resuming virtual machine 706 copies the data from the virtual machine queue 704 of the resuming virtual machine 706 to the processor queue 702. Returning to the example, when the processor resumes executing virtual machine 706A after executing virtual machine 706N, virtual machine 706A copies the data from virtual machine queue 704A to the processor queue 702. The processor them resumes execution of virtual machine 706A using the data in processor queue 702. In this way, the processor does not lose data when switching between virtual machines.

Embodiments of the present invention include a universal wireless repeater to extend the range of wireless connections. Conventional wireless repeaters employ proprietary wireless protocols, forcing a user to purchase all of his wireless equipment from the same manufacturer. The universal repeaters of the present invention employ only standard wireless protocols, freeing the user to purchase whatever wireless equipment he desires.

Figure 8:
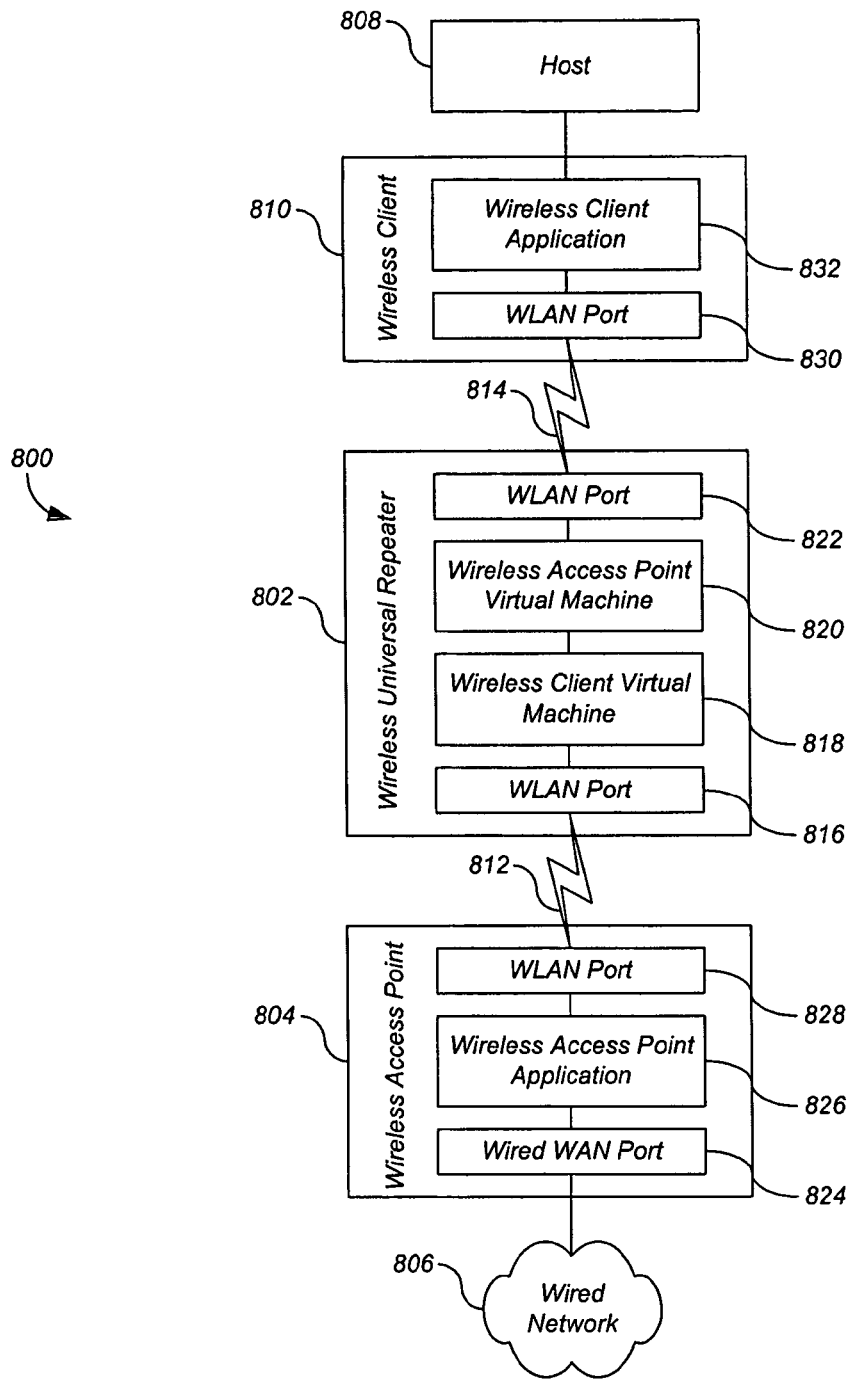
FIG. 8 shows a wireless network comprising a universal repeater according to a preferred embodiment of the present invention.

FIG. 8 shows a wireless network 800 comprising a wireless universal repeater 802 according to a preferred embodiment of the present invention. Wireless network 800 also comprises a conventional wireless access point 804 that communicates with wireless universal repeater 802 and a conventional wired network 806 such as the Internet. Wireless network 800 further comprises a conventional wireless client 810 that communicates with wireless universal repeater 802 and a conventional host 808 such as a personal computer.

Wireless access point 804 comprises a wired wide-area network port 824 to communicate with wired network 806, for example over a cable, a wireless local-area network (WLAN) port 828, and a wireless access point application 826 to exchange data traffic between ports 824 and 828, as is well-known in the relevant arts.

Wireless client 810 comprises a WLAN port 830 and a wireless client application 832 to exchange data traffic between port 830 and host 808, as is also well-known in the relevant arts. However, due to factors such as distance and blockage, wireless client 810 is unable to communicate directly with wireless access point 804.

Wireless universal repeater 802 provides the connectivity between wireless client 810 and wireless access point 804. Wireless universal repeater 802 comprises a wireless WLAN port 816 to communicate with wireless access point 804 over wireless link 812 and a WLAN port 822 to communicate with wireless client 810 over wireless link 814. Wireless links 812 and 814 can use the same band or different bands. Wireless universal repeater 802 executes two virtual machines concurrently, according to the techniques described above: wireless client virtual machine 818 and wireless access point virtual machine 820. Wireless virtual machines 818 and 820 together exchange data between wireless ports 816 and 822, thereby providing connectivity for wireless network 800 using standard wireless protocols such as IEEE 802.11 for wireless links 812 and 814.

Figure 9:
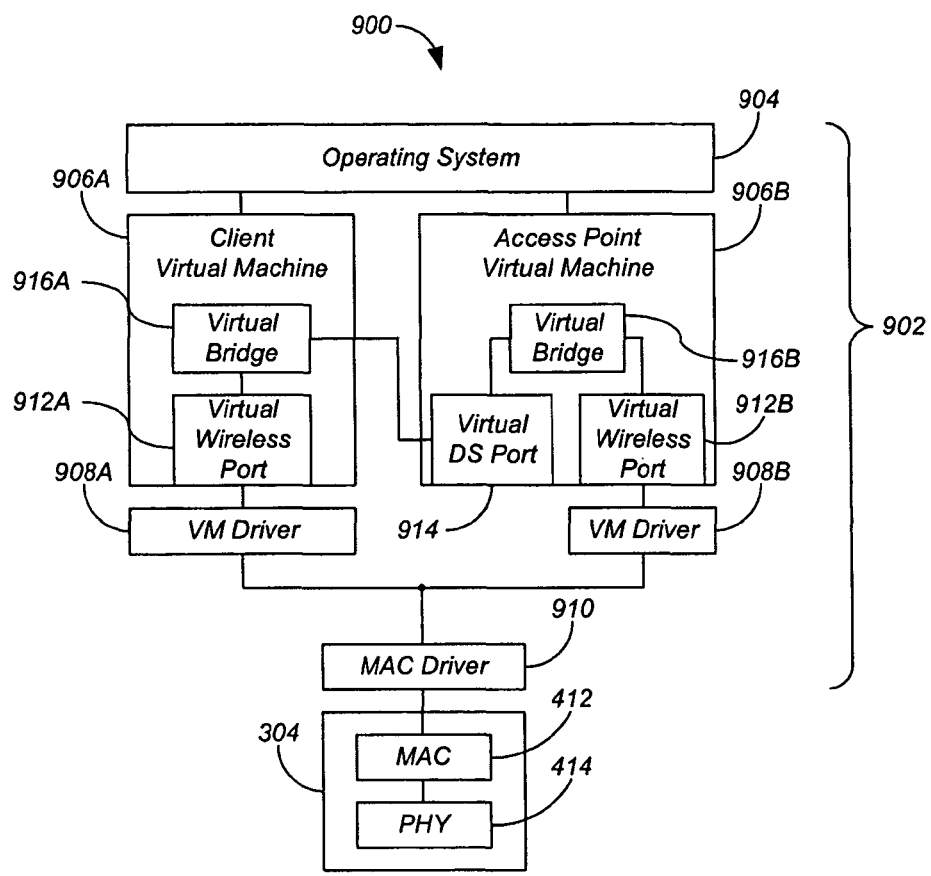
FIG. 9 shows an architecture for the universal repeater of FIG. 8 according to a preferred embodiment employing an embedded processor.

In some embodiments of wireless universal repeater 802, wireless access point virtual machine 820 and wireless client virtual machine 818 share a single hardware WLAN port that communicates with both wireless access point 804 and wireless client 810. FIG. 9 shows an architecture 900 for an embodiment employing an embedded processor. A similar architecture employing a host processor will be apparent to one skilled in the relevant arts after reading this description. Such embodiments represent a significant cost reduction over repeaters using two hardware ports.

Architecture 900 comprises a software image 902 and wireless port 304 of FIG. 3. Image 902 comprises a multitasking operating system 904, a client virtual machine 906A having a virtual machine (VM) device driver 908A, an access point virtual machine 906B having a VM device driver 908B, and a media access controller (MAC) device driver 910. Wireless port 304 comprises a MAC 412 and a wireless physical-layer device (PHY) 414.

Client virtual machine 906A comprises a virtual bridge 916A and a virtual wireless port 912A. Access point virtual machine 906B comprises a virtual bridge 916B, a virtual wireless port 912B, and a virtual distribution service (DS) port 914. Virtual bridges and virtual ports are software realizations of their hardware equivalents, as is well-known in the relevant arts.

Virtual wireless port 912A exchanges data between client virtual machine 906A and access point 804 of FIG. 8 using wireless port 304. Similarly, virtual wireless port 912B exchanges data between access point virtual machine 906B and client 810 of FIG. 8, also using wireless port 304. Virtual DS port 914 exchanges data between client virtual machine 906A and access point virtual machine 906B.

Bridge module 916B of access point virtual machine 906B maintains a bridge table or the like to distinguish local WLAN traffic (that is, traffic between client 810 and other such clients) from external traffic (that is, traffic between client 810 and network 804). In some embodiments, bridge module 916B employs a learning process to populate a bridge table for this purpose. Virtual bridge 910B directs traffic directed to the local WLAN to virtual wireless port 912B so it can reach the proper destination client in the local WLAN, and directs traffic not directed to the local WLAN to virtual DS port 914 so it can reach the proper destination in network 806 through access point 804.

Embodiments of the present invention are able to execute multiple wireless applications concurrently, for example in the universal repeater embodiment described above. Furthermore, switching between modes is fast and transparent to the user. In contrast to conventional combination wireless network devices, no rebooting is necessary. Finally, because the architectures of the preferred embodiments are efficient, all-in-one network devices according to preferred embodiments of the present invention can be light, inexpensive, and small enough to fit in a shirt pocket.

Embodiments of the present invention are ideal for new wireless users. New purchasers of wireless-enabled laptop computers often return home, power up their new laptops, and are disappointed to learn that no wireless connectivity awaits them. An embodiment of the invention featuring a wireless access point could be bundled with wireless laptops for sale. On returning home with the new laptop, a user could simply plug the all-in-one wireless network device into a phone jack or the like, power up the laptop, and enjoy instant wireless networking.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A wireless network device comprising:
a wireless network port;
a plurality of virtual machines including (i) a first virtual machine comprising a first wireless network application and a first queue, and (ii) a second virtual machine comprising a second wireless network application and a second queue, wherein each of the first virtual machine and the second virtual machine permits the first wireless network application and the second wireless network application to share the wireless network port; and
a processor having a third queue, wherein the processor is configured to concurrently execute, in turn, both of the first virtual machine and the second virtual machine, wherein while executing, in turn, both of the first virtual machine and the second virtual machine, the processor is configured to
while executing the first virtual machine, store, in the third queue, data to be processed by the first virtual machine, wherein the first virtual machine is configured to maintain, in the first queue, a copy of the data stored in the third queue as of a time the processor stops executing the first virtual machine, and
while executing the second virtual machine, store, in the third queue, data to be processed by the second virtual machine, wherein the second virtual machine is configured to maintain, in the second queue, a copy of the data stored in the third queue as of a time the processor stops executing the second virtual machine, wherein upon the processor resuming execution of the first virtual machine subsequent to the time the processor stops execution of the first virtual machine, the first virtual machine is configured to transfer, to the third queue, the copy of the data maintained in the first queue, and wherein upon the processor resuming execution of the second virtual machine subsequent to the time the processor stops execution of the second virtual machine, the second virtual machine is configured to transfer, to the third queue, the copy of the data maintained in the second queue.

2. The wireless network device of claim 1, wherein the first wireless network application includes a wireless network client application, and wherein the second wireless network application includes a wireless network access point application.

3. A wireless network repeater including the wireless network device of claim 2.

4. The wireless network repeater of claim 3, wherein:
the first virtual machine includes a first virtual bridge, and
the second virtual machine includes a second virtual bridge.

5. The wireless network repeater of claim 4, wherein the first virtual machine includes a virtual distribution service (DS) port configured to exchange data between the first virtual bridge and the second virtual bridge.

6. The wireless network repeater of claim 5, wherein:
the first virtual machine includes a first virtual wireless port configured to communicate between the wireless network port and the first virtual bridge, and
the second virtual machine includes a second virtual wireless port configured to communicate between the wireless network port and the second virtual bridge.

7. The wireless network device of claim 1, further comprising a memory system configured to store the first queue, the second queue, and the third queue.

8. The wireless network device of claim 7, wherein the memory system includes a memory controller and at least one of volatile memory and non-volatile memory.

9. The wireless network device of claim 1, wherein:
the first wireless network application includes at least one of (i) a wireless network access point application, (ii) a wireless network client application, (iii) a wireless network point-to-point bridge application, (iv) a wireless network multi-point bridge application, and (v) a wireless network repeater application, and
the second wireless network application includes at least a different one of (i) the wireless network access point application, (ii) the wireless network client application, (iii) the wireless network point-to-point bridge application, (iv) the wireless network multi-point bridge application, and (v) the wireless network repeater application.

10. The wireless network device of claim 1, wherein the wireless network port comprises:
a wireless physical-layer device configured to interface with a physical wireless medium; and
a media access controller configured to communicate between the wireless physical-layer device and the processor.

11. A method of operating a wireless network device, the method comprising:
concurrently executing, in turn, a first virtual machine and a second virtual machine, wherein the first virtual machine comprises a first wireless network application and a first queue,
the second virtual machine comprises a second wireless network application and a second queue, and
each of the first virtual machine and the second virtual machine permits the first wireless network application and the second wireless network application to share a wireless network port of the wireless network device;

while executing the first virtual machine, storing, in a third queue, data to be processed by the first virtual machine;

while executing the first virtual machine, maintaining, in the first queue, a copy of the data stored in the third queue as of a time the execution of the first virtual machine is stopped;

while executing the second virtual machine, storing, in the third queue, data to be processed by the second virtual machine;

while executing the second virtual machine, maintaining, in the second queue, a copy of the data stored in the third queue as of a time execution of the second virtual machine is stopped;

upon resuming execution of the first virtual machine subsequent to the time execution of the first virtual machine was stopped, transferring, to the third queue, the copy of the data maintained in the first queue; and upon resuming execution of the second virtual machine subsequent to the time execution of the second virtual machine was stopped, transferring, to the third queue, the copy of the data maintained in the second queue.

12. The method of claim 11, wherein the first wireless network application includes a wireless network client application, and wherein the second wireless network application includes a wireless network access point application.

13. The method of claim 12, wherein:
the first virtual machine includes a first virtual bridge, and
the second virtual machine includes a second virtual bridge.

14. The method of claim 13, wherein the first virtual machine includes a virtual distribution service (DS) port configured to exchange data between the first virtual bridge and the second virtual bridge.

15. The method of claim 14, wherein:
the first virtual machine includes a first virtual wireless port configured to communicate between the wireless network port and the first virtual bridge, and
the second virtual machine includes a second virtual wireless port configured to communicate between the wireless network port and the second virtual bridge.

16. The method of claim 11, further comprising storing the first queue, the second queue, and the third queue in a memory system.

17. The method of claim 11, wherein:
the first wireless network application includes at least one of (i) a wireless network access point application, (ii) a wireless network client application, (iii) a wireless network point-to-point bridge application, (iv) a wireless network multi-point bridge application, and (v) a method application, and
the second wireless network application includes at least a different one of (i) the wireless network access point application, (ii) the wireless network client application, (iii) the wireless network point-to-point bridge application, (iv) the wireless network multi-point bridge application, and (v) the method application.

* * * * *